United States Patent Office 2,895,987
Patented July 21, 1959

2,895,987

METHOD OF PREPARING ALPHA-SULFO ACRYLIC ACID

Charles Malcolm Hendry, Cuyahoga Falls, Ohio, assignor to The B. F. Goodrich Company, New York, N.Y., a corporation of New York No Drawing. Application December 20, 1956
Serial No. 629,469

1 Claim. (Cl. 260—513)

This invention relates to a method for preparing alpha-sulfo, alpha-beta unsaturated carboxylic acids and salts by reacting a halosulfonic acid with an alpha-beta unsaturated acid or anhydride, said acid or anhydride having a hydrogen atom on the carbon atom in the position alpha to or adjacent the carboxyl or anhydride group, and thereafter dehydrohalogenating the sulfo-halogenated product and more particularly pertains to a method for preparing alpha-sulfoacrylic acid and alpha-sulfomaleic acids and certain derivatives by reacting a beta-halopropionic acid, acrylic acid or maleic acid or maleic anhydride with a halosulfonic acid and thereafter treating the sulfonated acid with a dehydrohalogenating agent to form an alpha-sulfo, alpha-beta unsaturated salt and converting the salt to the acid.

Alpha-sulfoacrylic acid has previously been synthesized by reacting beta-chloropropionic acid and fuming sulfuric acid and thereafter treating the reaction product with barium carbonate. This synthesis was reported by Backer in Rec. Trav. Chim. 62, 46 (1943). This same author reported a method of preparing barium salts of alpha-sulfomaleic acid by reacting maleic anhydride with $SO_3$ for about 5 hours at 50° C. and thereafter treating this reaction product with a slurry of aqueous barium carbonate. This work is reported in Rec. Trav. Chim. 49, 735 (1930).

It is an object of this invention to prepare salts of alpha-sulfo, alpha-beta unsaturated acids by reacting a beta-halopropionic acid or an alpha-beta unsaturated acid or anhydride with chlorosulfonic acid and thereafter dehydrohalogenating the sulfonated saturated acid to form a salt of the alpha-beta unsaturated monocarboxylic or dicarboxylic acid. On treatment with a strong acid the free alpha-sulfo, alpha-beta unsaturated acid is formed.

Another object is the provision of a method for preparing salts of alpha-sulfoacrylic acid or alpha-sulfomaleic acid by reacting acrylic acid or maleic anhydride with chlorosulfonic acid at a temperature of from about 50 to about 158° C. and thereafter digesting the mixture with a dehydrohalogenating agent to form a salt of alpha-sulfoacrylic acid.

Still another object is the provision of a method for preparing barium salts of alpha-sulfoacrylic acid by reacting a beta-chloro or beta-bromo propionic acid with chlorosulfonic acid at a temperature from about 50 to 158° C. thereafter treating the reaction product with a dehydrohalogenating agent to form a salt of alpha-sulfoacrylic acid.

Still another object is the provision of a method for preparing salts of alpha-sulfomaleic acid by reacting maleic anhydride with chlorosulfonic acid at an elevated temperature of from about 50 to 158° C. thereafter treating the reaction product with a dehydrohalogenating agent to form the salt of alpha-sulfomaleic acid.

These objects are accomplished by adding chlorosulfonic acid slowly to the beta-halopropionic acid, to acrylic acid, beta-substituted acrylic acids or to maleic anhydride, maleic acid or mono-substituted derivatives of the maleic compounds or other alpha-beta unsaturated acid, controlling the temperature between about 50 and 158° C. and preferably between about 80 and 100° C. permitting the reaction to go to substantial completion and then treating the reaction mixture with a dehydrohalogenating agent to thereby form a salt of the alpha-sulfo, alpha-beta unsaturated acid.

Dehydrohalogenating agents which can be used include the alkaline earth metal carbonates, such as calcium, magnesium, strontium, cadmium and barium carbonates, and tertiary amines such as trimethyl amine, triethyl amine, tripropyl amine, and other trialkyl amines, pyridine and other tertiary amines. Of these dehydrohalogenating agents barium and calcium carbonates are preferred.

Representative acids which can be reacted with chlorosulfonic acid include those mentioned above and acids such as crotonic acid, citraconic acid and its anhydride, monohalomaleic acids and their anhydrides, pentene-2-oic acid, hexene-2-oic acid, and other alpha-beta olefinically unsaturated acids having a hydrogen atom on the carbon atom alpha to the carboxyl group.

The free alpha-sulfo acid is stable only in aqueous medium and has not been isolated in its pure form. However, it is possible to prepare a fairly concentrated solution of the acid by passing a warm aqueous solution of a salt of the alpha-sulfo, alpha-beta unsaturated acid through an ion exchange column containing a cation adsorbing resin which will adsorb the cations and substitute hydrogen ions. The aqueous solution of alpha-sulfo, alpha-beta unsaturated acid can then be concentrated further by distillation of the water from the solution. However, if concentration is too great the acid is converted to a viscous syrup which may be a polymer of the alpha-sulfo acid. The viscous syrup does not adsorb bromine and its acid number is reduced by about 50%.

In carrying out the reaction between the alpha-beta unsaturated acid or beta-halo acid and the chlorosulfonic acid no diluent is necessary and it is preferred that the reaction be carried out in bulk. However, the reaction is exothermic and if desired an inert diluent can be employed. Caution however should be taken not to use materials which will react with either the unsaturated acid, the beta-halo acid, the anhydride or the halosulfonic acid used in preparing the desired end product. In the following examples all proportions are given by weight unless otherwise specified.

*Example 1*

A half mole of acrylic acid containing a trace of methylene blue was placed in a 3 necked flask equipped with a stirrer, a thermometer and a dropping funnel. A half mole of chlorosulfonic acid was added to stirred acrylic acid through the dropping funnel. Rapid addition of the chlorosulfonic acid caused a temperature rise to about 145° C. The mixture was cooled to 80° C. and the remainder of the chlorosulfonic acid was added at this temperature over a period of about 10 to 15 minutes. After addition of the chlorosulfonic acid, the reaction mixture was stirred for 2 hours at a temperature between 65 and 90° C. About 1500 ml. of water were added slowly and thereafter 250 grams of barium carbonate were added to the reaction mixture which was further diluted to a total volume of 3000 ml. This mixture was permitted to stand overnight at room temperature and then warmed on a steam bath for about 3 hours. After this digestion period the insoluble materials were removed by filtration of the hot solution and the filtrate was concentrated and cooled to permit the barium salt of alpha-sulfo acrylic acid to crystallize. The total barium alpha-sulfo acrylate recovered from this reaction was 93 grams or 64.7% yield. The barium salt is slightly soluble in the hot water and can be recrystallized therefrom. From the infrared spectrum which showed adsorption peak at 11.13 and 9.72 mu it is disclosed that the sulfonic acid group was on the carbon atom alpha to the carboxyl group. Elemental analysis and unsaturation analysis indicate that the barium compound was about 96% alpha-sulfo barium acrylate.

*Example II*

54.3 parts of beta-chloropropionic acid were added to a flask equipped with a stirrer, a thermometer and a dropping funnel. 58.3 parts of chlorosulfonic acid were added to the beta-chloropropionic acid over a period of 4 minutes. This reaction is only very slightly exothermic, since there was a rise in temperature of only about 15° C. The reaction mixture was then heated on a steam bath at a temperature between about 80 and 100° C. for about 3¼ hours. Stirring was continued during this entire reaction period. At the end of this time 1500 ml. of water and 200 grams of barium carbonate were added to the reaction mixture which was then digested for 2 hours on a steam bath. 54.3 grams of the barium salt of alpha-sulfo acrylic acid, representing a 55.7% yield were recovered. The use of beta-bromo propionic acid in place of beta-chloropropionic acid provides substantially similar results.

*Example III*

49 parts of maleic anhydride were added to a 3 necked flask equipped with a stirrer, a thermometer and a dropping funnel. The anhydride was heated above its meltig point (60–65° C.) and thereafter 33 ml. of chlorosulfonic acid were added over a period of about 2 minutes. After completing the addition of the chlorosulfonic acid the raction mixture was held at a temperature of from 60 to 110° C. for 3 hours. At the end of this period the reaction mixture was poured into a slurry containing 200 grams of barium carbonate in 1500 ml. of water. The reaction mixture then was warmed on a steam bath for about 2 hours. At the end of this time the mixture was filtered and the barium salt of alpha-sulfo-maleic acid was recovered. The barium alpha-sulfomaleate settled out of the reaction mixture in crystalline form. The salt is quite insoluble in water. Accordingly, it was necessary to use large volumes of hot water to separate the barium alpha-sulfomaleate from its impurities. 34.3 grams of the pure salt were recovered.

Substitution of calcium, strontium, magnesium or cadmium carbonate for the barium carbonate will also result in dehydrohalogenation. When tertiary amines are employed as dehydrohalogenating agents it is necessary to operate under pressure with trimethyl amine, and under reflux with other amines which boil at or near the temperature of the steam bath.

The alpha-sulfo acids are very deliquescent and can be used as dehydrating agents or humectants. Alpha-sulfo acrylic acid was prepared by passing an aqueous solution of the barium salt through a cation exchange resin. The aqueous solution of the alpha-sulfo acrylic acid was concentrated by removing water under vacuum until a viscous syrup remained. In six hours exposure to air having about 50% humidity at about 72° F. the viscous syrup absorbed moisture equal to about 17% of the weight of the syrup. Concentrated sulfuric acid under these same conditions absorbed 10% of its weight. In addition to faster absorption, the syrup releases water faster. After exposure to moist air the alpha-sulfo acrylic acid syrup and the sulfuric acid were placed in a vacuum desiccator and a vacuum produced by a water aspirator was drawn. In three hours at room temperature the alpha-sulfo acrylic acid lost about 10% of its increased weight, and the $H_2SO_4$ lost only 2%.

The alpha-sulfo acrylic acid can also be copolymerized with acrylic esters, such as methyl acrylate, ethyl acrylate, methylmethacrylate and other alkyl esters of acrylic acid or alpha-alkyl acrylic acid. Vinyl acetate can also be copolymerized with the alpha-sulfo acrylic acids.

Although I have described my invention with specific examples, these are intended as illustrative and not as limitations, for it is apparent that there are numerous variations in reactants, proportions of ingredients, and reaction conditions which can be employed without departing from the spirit and scope of the invention.

I claim:

A method which comprises reacting acrylic acid with chlorosulfonic acid at a temperature of from about 50° C. and not substantially above 158° C. and thereafter treating the reaction product thus formed with barium carbonate in an aqueous medium and recovering the barium salt of alpha-sulfo acrylic acid.

References Cited in the file of this patent

UNITED STATES PATENTS 2,268,443    Crowder     Dec. 30, 1941

FOREIGN PATENTS 607,204    Great Britain     Aug. 26, 1948

OTHER REFERENCES

Backer et al.: Recueil des Travaux Chemique des Pays-Bas, vol. 49, 735 to 744 (10 pages), 1930.

Backer et al.: Recueil des Travaux Chimique des Pays-Bas, vol. 62, 46 to 52 (7 pages) (pages 46, 47 particularly), 1943.